April 23, 1957     R. A. SICHO     2,790,051

A.C.-D.C. TESTING DEVICE

Filed Feb. 5, 1954

INVENTOR
ROMAN A SICHO
BY *A. John Michel*
ATTORNEY

United States Patent Office 2,790,051
Patented Apr. 23, 1957

2,790,051
A. C.-D. C. TESTING DEVICE

Roman A. Sicho, Elmhurst, N. Y., assignor to Electronic Instrument Company, Inc., Brooklyn, N. Y.

Application February 5, 1954, Serial No. 408,469

9 Claims. (Cl. 200—157)

My present invention relates to improvements in testing devices or probes for electric circuits requiring the use of more than one type of source of electric energy, such as sources of alternating and of direct current.

Particularly where the testing device is designed to cooperate with a highly sensitive measuring instrument, such as a vacuum tube voltmeter or the like, it may be desirable to have the resistor in the probe rather than in the instrument in order to reduce contact potential and to reduce pickup; it is also necessary to adapt the impedance of a probe to that of the circuit to be tested, in order not to overload the meter. The impedance of the circuit to be tested, however, will in many instances be different for alternating and for direct current, being usually larger in the former case. It has, therefore, been the practice to provide two separate probes for testing with A. C. and D. C. current sources, respectively, the D. C. probe incorporating an additional resistance to compensate for the aforementioned difference in circuit impedance. The use of two probes entails, of course, considerable inconvenience, delay and expense.

It is, accordingly, an object of my present invention to provide a testing device of the aforementioned character having means for quickly and easily converting it from a probe suitable for one type of electric energy (e. g. direct current) into a probe adapted to be used with another type of electric energy (e. g. alternating current) and vice versa.

It is another object of this invention to provide a convertible probe as set forth in which reversible switch means adapted to effect the conversion are coupled with means for positively indicating to the user the condition in which the device has been placed, thereby obviating the risk of using the probe in combination with a source of current to which it has not been adjusted.

A further object of the invention is to provide reversible switch means, for the purpose indicated above, so positioned as to occupy a minimum of space and to be readily accessible for operation without unduly increasing the bulk of the probe.

The above and other objects and features of this invention will become more fully apparent from the following description of a now preferred embodiment, reference being had to the accompanying drawing in which.

Figure 1:
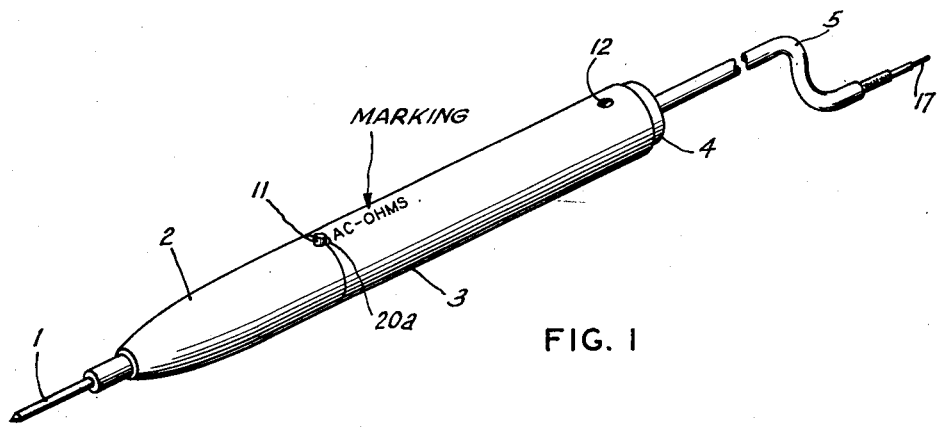
Fig. 1 is a perspective view of a testing device according to the invention.
Figure 5:
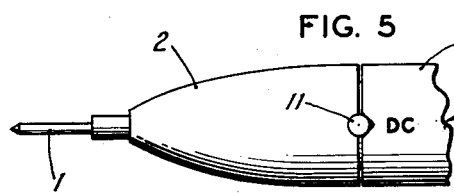
Fig. 5 is a fragmentary bottom view of the device in an alternate position.
Figure 2:
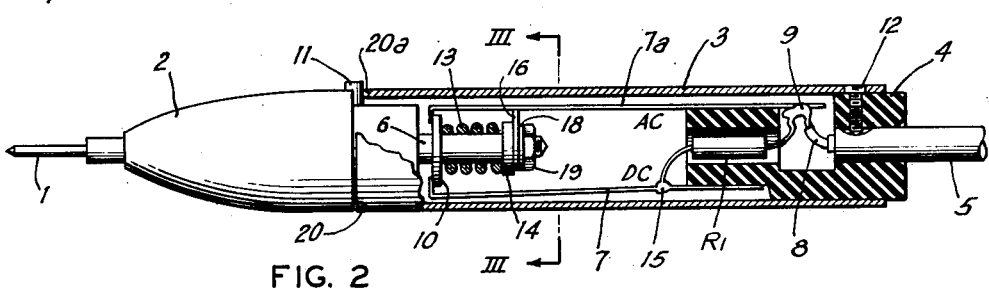
Fig. 2 is a side elevation of the device of Fig. 1, partly in longitudinal axial section.
Figure 3:
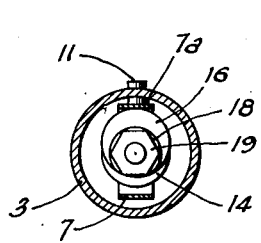
Fig. 3 is a section taken on line III—III of Fig. 2.
Figure 4:
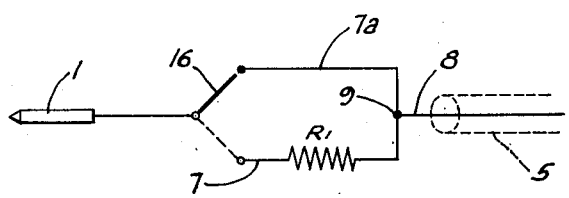
Fig. 4 is a schematic circuit diagram of the testing device shown in Fig. 1.

The testing device shown in the drawing, whose elements have been uniformly designated throughout the several views, comprises a contact electrode or probe tip 1 projecting from one end of a tubular housing 3. An insulated lead wire 5, projecting from the opposite end of the housing 3, is connected to another tip 17 adapted to engage a terminal of a voltmeter, current source, etc. (not shown). A coaxial cable comprising an outer sheath 5 and an inner conductor 8 passes through an insulating plug 4 which is immobilized with respect to the housing by a set screw 12 also engages the cable sheath 5, thereby grounding it to the probe housing 3. Plug member 4, extending inwardly within housing 3 beyond cable sheath 5, has attached to it a pair of resilient contact springs 7, 7a provided with bent-over forward ends. A metallic stem 6, forming an electrical extension of probe tip 1, is fixed to a rotatable head 2 positioned forwardly of the housing 3. A coil spring 13 bears upon an annular shoulder 14, formed at the rear end of stem 6, and also presses against an insulating ring 10 which is slidably mounted on stem 6 and engaged by the prong-like, bent-over ends of springs 7 and 7a. Coil spring 13 thereby tends to push the assembly 2, 6, 14 to the rear and urges the head 2 into firm resilient contact with housing 3. A stud 11, secured to head 2, is adapted to enter either one of two notches 20, 20a on housing 3, thereby indexing the head 2 in either of two diametrically opposite positions. A metallic cam member 16, clamped by a nut 18 to the threaded end 19 of stem 6 and held in conductive contact therewith, engages either of springs 7 or 7a in respective ones of the two indexed positions of head 2. With stud 11 in engagement with notch 20a, as shown in Fig. 2, cam 16 makes contact with spring 7a which at 9 is shown connected to inner conductor 8 of the coaxial cable. A resistor R1, having one terminal connected to junction 9, has its other terminal connected to contact spring 7 at 15, thereby adapting the device for use in a D. C. testing circuit when the cam 16 makes contact with spring 7. The two positions of head 2 may thus be designated by suitable markings as the A. C. and the D. C. position, as indicated in Figs. 1 and 5, respectively.

It will be understood that current-limiting resistors such as R1, or other impedances, may be provided in either or both of the A. C. and D. C. paths as may be required.

It will thus be apparent that in the A. C. position of head 2, cam 16 effectively contacts resilient spring 7a, simultaneously breaking contact with spring 7, thereby adapting the device for use in series with an A. C. source; conversely, in the D. C. position of head 2, cam 16 effectively contacts resilient spring 7 and breaks contact with resilient spring 7a, thereby effectively including resistance R1 in the circuit and adapting the device for use in series with a D. C. source.

It is understood that the invention is not limited to the particular embodiment described and illustrated but may be embodied in various modifications and adaptations without departing from the spirit and scope of the appended claims.

I claim:

1. An electric testing device comprising an elongated contact electrode, a tubular housing surrounding said electrode, a control member rotatably held on said housing and concentrically surrounding said electrode, conductor means extending from said housing, circuit means within said housing including a plurality of contact elements connected to said conductor means, switch means for selectively connecting said electrode with any one of said contact elements, and means including said control member for operating said switch means.

2. A device according to claim 1, wherein said switch means comprises two contact elements adapted to engage said electrode in alternate positions, said control member being provided with actuating means for removing said contact elements from said electrode in selected positions of said control member.

3. A device according to claim 2, wherein said contact elements comprise two elongated springs.

4. A device according to claim 2, wherein said actuating means comprises a cam on said control member, said cam being mounted on a support member, extending between said contact elements, in such manner that it contacts a respective one of said elements in each of its alternate positions.

5. A device according to claim 1, wherein said control member comprises a knob externally of said housing axially movable with respect thereto, said knob being provided with an extension within said housing, said device further including spring means in said housing engaging said extension and urging said knob into contact with said housing.

6. A device according to claim 5, wherein said housing and said knob are cooperating formations, said spring means urging said formations into mutual engagement in two alternate positions of said knob relative to said housing.

7. A device according to claim 6, wherein said spring means bears upon said contact elements for axial displacement of said knob relative to said housing.

8. A device according to claim 1, wherein said control member is provided with indicator means, said housing being provided with a formation cooperating with said indicator means to indicate the instantaneous position of said switch means.

9. An electric testing device comprising a tubular housing, an elongated contact electrode projecting from one end of said housing, a head concentrically surrounding said electrode and rotatably held in one end of said housing, said electrode having a portion extending beyond said head within said housing, a conductor entering said housing from the other end, two contact springs conductively connected with said conductor, and a cam secured to said head and so positioned between said contact springs as to make contact in alternate positions with one of said springs while breaking such contact with the other, said cam being conductively connected to said electrode.

References Cited in the file of this patent
UNITED STATES PATENTS

| | | |
|---|---|---|
| 2,523,518 | Rapaport | Sept. 26, 1950 |
| 2,658,132 | Welch | Nov. 3, 1953 |